US008890373B2

(12) United States Patent
Savolainen et al.

(10) Patent No.: US 8,890,373 B2
(45) Date of Patent: Nov. 18, 2014

(54) POWER DISTRIBUTION SYSTEMS USING DISTRIBUTED CURRENT SENSING

(75) Inventors: Ari Heikki Savolainen, Vantaa (FI); Eric Mikael Totterman, Tahtela (FI); Esa Kai Paatero, Helsinki (FI)

(73) Assignee: Eaton Corporation, Cleveland, OH (US)

( * ) Notice: Subject to any disclaimer, the term of this patent is extended or adjusted under 35 U.S.C. 154(b) by 550 days.

(21) Appl. No.: 13/079,337

(22) Filed: Apr. 4, 2011

(65) Prior Publication Data
US 2012/0248897 A1 Oct. 4, 2012

(51) Int. Cl.
G05F 1/22 (2006.01)
H02J 9/06 (2006.01)
H02J 3/00 (2006.01)

(52) U.S. Cl.
CPC .. H02J 9/062 (2013.01); H02J 3/00 (2013.01)
USPC .......................................................... 307/151

(58) Field of Classification Search
USPC ........................................ 307/151, 64, 65, 66
See application file for complete search history.

(56) References Cited

U.S. PATENT DOCUMENTS

| 4,876,625 | A | * | 10/1989 | Wolfe | 361/93.5 |
|---|---|---|---|---|---|
| 5,132,867 | A | * | 7/1992 | Klancher | 361/62 |
| 5,612,580 | A | * | 3/1997 | Janonis et al. | 307/64 |
| 6,295,215 | B1 | | 9/2001 | Faria et al. | |
| 6,906,933 | B2 | | 6/2005 | Taimela | |
| 7,105,952 | B2 | * | 9/2006 | Divan et al. | 307/98 |
| 8,334,615 | B2 | * | 12/2012 | Sannino et al. | 307/38 |
| 2002/0134567 | A1 | | 9/2002 | Rasmussen et al. | |
| 2008/0157598 | A1 | * | 7/2008 | Kuitani et al. | 307/45 |
| 2008/0158917 | A1 | | 7/2008 | Chen | |
| 2010/0026098 | A1 | | 2/2010 | Marbach et al. | |
| 2011/0278934 | A1 | * | 11/2011 | Ghosh et al. | 307/66 |

OTHER PUBLICATIONS

International Search Report Corresponding to International Application No. PCT/US2012/031065; Date of Mailing: Jul. 16, 2012; 10 Pages.
International Preliminary Report on Patentability Corresponding to International Application No. PCT/US2012/031065; Date of Mailing: Oct. 17, 2013; 7 Pages.

* cited by examiner

Primary Examiner — Jared Fureman
Assistant Examiner — Daniel Kessie
(74) Attorney, Agent, or Firm — Myers Bigel Sibley & Sajovec, P.A.

(57) ABSTRACT

A system includes a plurality of power conversion devices, for example, uninterruptible power supply (UPS) devices, having inputs coupled in common to a power input line and each including a control circuit configured to operate the power conversion device responsive to a current sense signal at a current sense input thereof. The system further includes a first current transformer having a primary winding inductively coupled to the power input line, a current sense line coupled in series with a secondary winding of the first current transformer and a plurality of second current transformers, each including a primary winding inductively coupled to the current sense line and including respective secondary windings coupled to respective ones of the current sense inputs.

16 Claims, 4 Drawing Sheets

POWER DISTRIBUTION SYSTEMS USING DISTRIBUTED CURRENT SENSING

BACKGROUND

The inventive subject matter relates to power distribution and, more particularly, to power distribution systems including multiple power conversion devices.

Uninterruptible power supply (UPS) devices are commonly used to provide uninterrupted power in critical applications, such as industrial, medical and data processing applications. For example, in data center applications, multiple UPS devices may have inputs coupled in common to an AC power source (e.g., a utility input), and may provide uninterrupted power to groups of equipment racks housing servers, routers and other network equipment. Similar arrangements of UPS devices may be used in telecommunications installations.

Recently developed UPS devices include power conversion circuitry that may perform functions such as harmonic compensation. The control circuitry for such functions may rely on sensing various input and output voltages and currents. UPS systems capable of harmonic compensation are described, for example, in U.S. Pat. No. 6,295,215 to Faria et al. and U.S. Pat. No. 6,906,933 to Taimela.

SUMMARY

In some embodiments of the inventive subject matter, a system includes a plurality of power conversion devices having inputs coupled in common to a power input line and each including a control circuit configured to operate the power conversion device responsive to a current sense signal at a current sense input thereof. The system further includes a first current transformer having a primary winding inductively coupled to the power input line, a current sense line coupled in series with a secondary winding of the first current transformer and a plurality of second current transformers, each including a primary winding inductively coupled to the current sense line and including respective secondary windings coupled to respective ones of the current sense inputs. In some embodiments, the plurality of power conversion devices may include a plurality of uninterruptible power supply devices. The second current transformers may be co-located with the uninterruptible power supply devices and/or positioned remotely from the uninterruptible power supply devices.

In further embodiments, an uninterruptible power supply apparatus includes a plurality of uninterruptible power supply modules, each having a current sense input and at least one current transformer having a primary winding configured to be inductively coupled to a secondary winding of an external current transformer and a secondary winding coupled to the current sense inputs of the uninterruptible power supply modules. The at least one current transformer may include a plurality of current transformers and secondary windings of respective ones of the plurality of current transformers may be coupled to current sense inputs of respective ones of the uninterruptible power supply modules. The apparatus may further include a bypass circuit configured to bypass the plurality of current transformers. The uninterruptible power supply modules may be configured to provide harmonic compensation responsive to a current sense signal produced by the at least one current transformer.

In additional embodiments of the inventive subject matter, a system includes a first current transformer including a primary winding inductively coupled to a power line of a power distribution system, a current sense line coupled in series with a secondary winding of the first current transformer and a plurality of second current transformers, each second current transformer including a primary winding inductively coupled to the current sense line. Respective ones of the second current transformers have a secondary winding configured to be coupled to respective current monitoring devices.

DETAILED DESCRIPTION OF EMBODIMENTS

Figure 1:
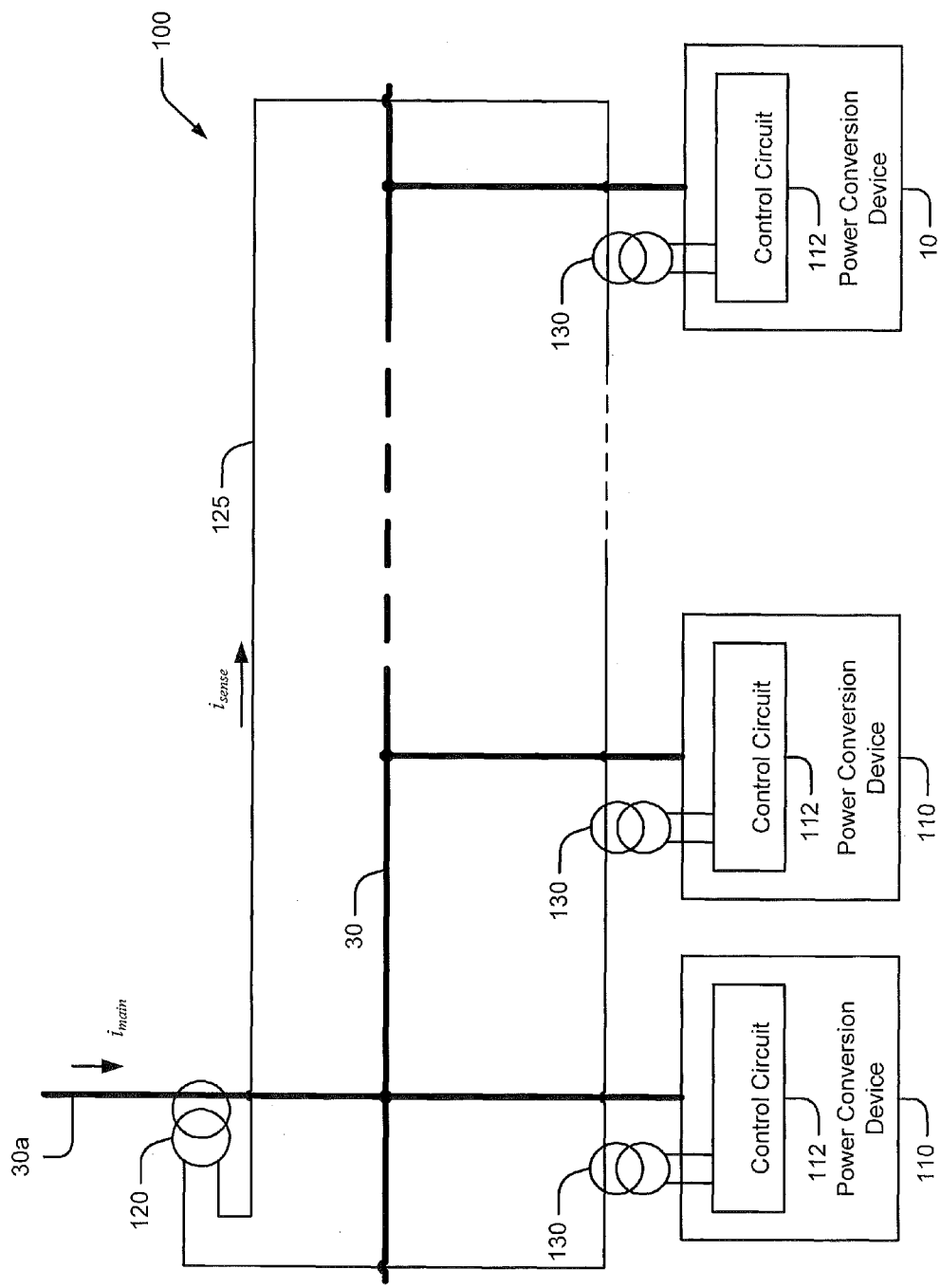
FIG. 1 is a schematic diagram illustrating a power distribution system with distributed current sensing according to some embodiments of the inventive subject matter.

Specific embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the inventive subject matter may be embodied as systems and methods. Some embodiments of the inventive subject matter may include hardware and/or combinations of hardware and software. Some embodiments of the inventive subject matter include circuitry configured to provide functions described herein. It will be appreciated that such circuitry may include analog circuits, digital circuits, and combinations of analog and digital circuits.

Embodiments of the inventive subject matter are described below with reference to diagrams of systems and methods according to various embodiments of the inventive subject matter. It will be understood that each block of the diagrams, and combinations of blocks in the diagrams, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the diagrams.

FIG. 1 illustrates a power distribution system 100. The system 100 includes a plurality of power conversion devices 110, e.g., uninterruptible power supply (UPS) devices, coupled to a power distribution network 30. Each of the power conversion devices 110 includes a control circuit 112, which may be configured to perform various control, monitoring and other functions associated with operations of the power conversion devices 110. For example, for power conversion devices 110 in the form of UPS devices, the control circuits 122 may control UPS system components, such as rectifiers, inverters, bypass circuits and the like.

As illustrated, a first current transformer 120 is configured to sense a current $i_{main}$ in an input line 30a of the power distribution network 30. In particular, a primary winding of the first current transformer 120 may be inductively coupled to the input line 30a, inducing a current $i_{sense}$ in a secondary winding of the first current transformer 120 that is connected in series with a current sense line 125.

Respective second current transformers 130 are operatively coupled to the current sense line 125 and to respective ones of the control circuits 112 of the power conversion devices 110. In particular, primary windings of the second current transformers 130 may be inductively coupled to the current sense line 125, such that the sense current $i_{sense}$ in the current sense line 125 induces corresponding currents in the secondary windings of the second current transformers 130. These secondary winding currents may be sensed by the respective control circuits 112. The second current transformers 130 may be co-located with the power conversion devices 110 and/or may remotely located.

Figure 2:
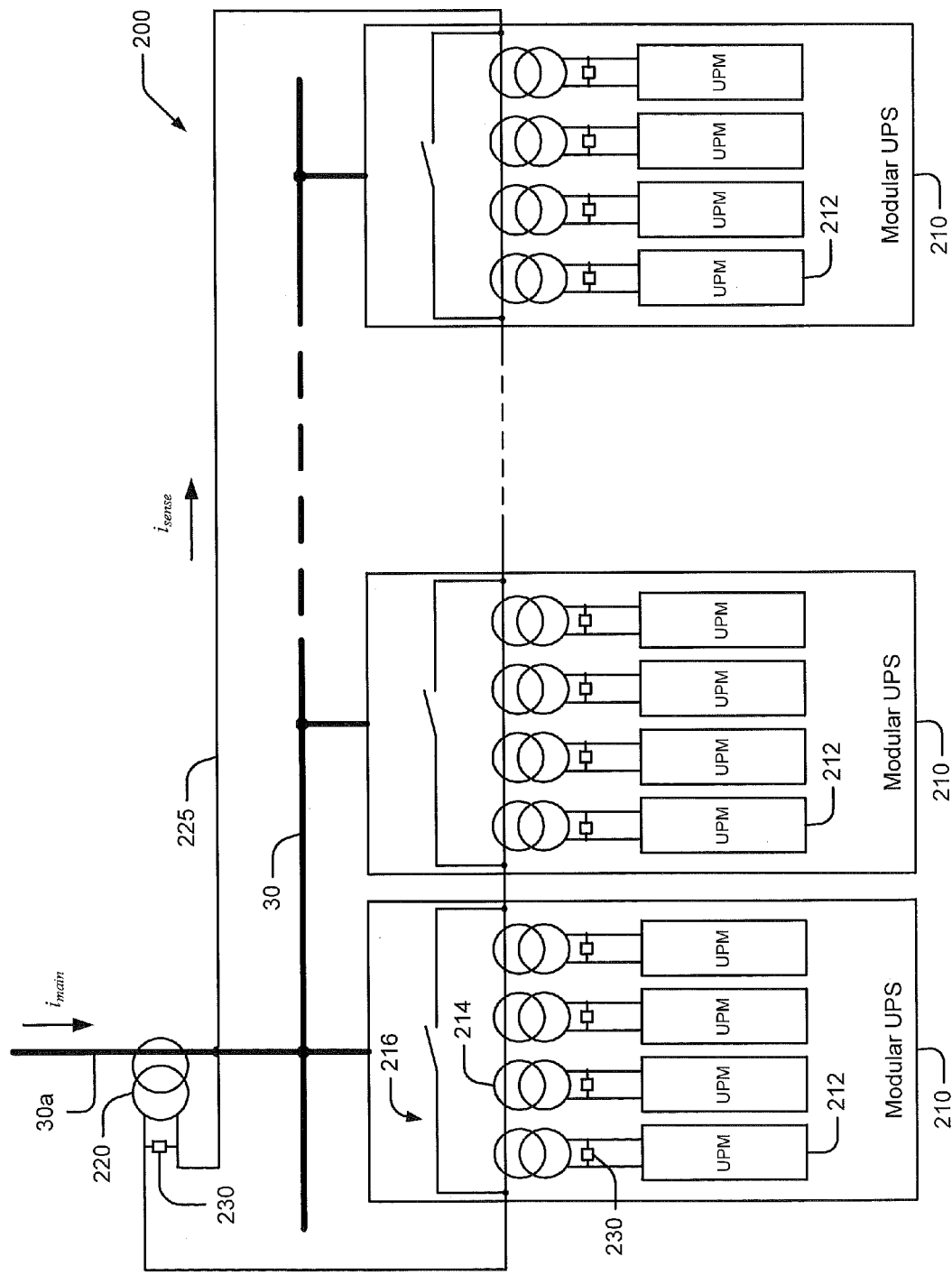
FIG. 2 is a schematic diagram illustrating a power distribution system including multiple modular UPS devices and distributed current sensing according to some embodiments of the inventive subject matter.

FIG. 2 illustrates a power distribution system 200 according to further embodiments. The power distribution system 200 includes a plurality of modular UPS assemblies 210 coupled to a power distribution network 30. Each of the modular UPS assemblies 210 includes a plurality of uninterruptible power modules (UPMs) 212, which may include, for example, a combination of an input rectifier and output inverter linked by a DC bus. The UPMs 212 may include additional circuitry, such as battery interface and bypass circuitry.

Current sensing circuitry includes a first current transformer 220 configured to sense a current $i_{main}$ in an input line 30a of the power distribution network 30. Along lines described above with reference to FIG. 1, a primary winding of the first current transformer 220 may be inductively coupled to the input line 30a, inducing a current $i_{sense}$ in a secondary winding of the first current transformer 130 that is connected in series with a current sense line 225.

Second current transformers 214 of the UPS assemblies 210 are operatively coupled to the current sense line 225, i.e., have primary windings inductively coupled the current sense line 225. Secondary windings of the respective second transformers 214 are coupled to respective ones of the UPMs 212, such that each UPM 212 may sense the current $i_{sense}$. As further illustrated, bypass circuits 216 may be provided to bypass the second current transformers 214 associated with the individual UPS assemblies 210 for maintenance and other purposes. The bypass circuit 216 may include, for example, mechanical and/or solid state switching elements and/or other means for providing an interruptible connection, such as wire jumpers. As further illustrated, protective elements 250 (e.g., zener diodes or varistors) may be coupled to the secondary windings of the first and second current transformers 220, 214.

Figure 3:
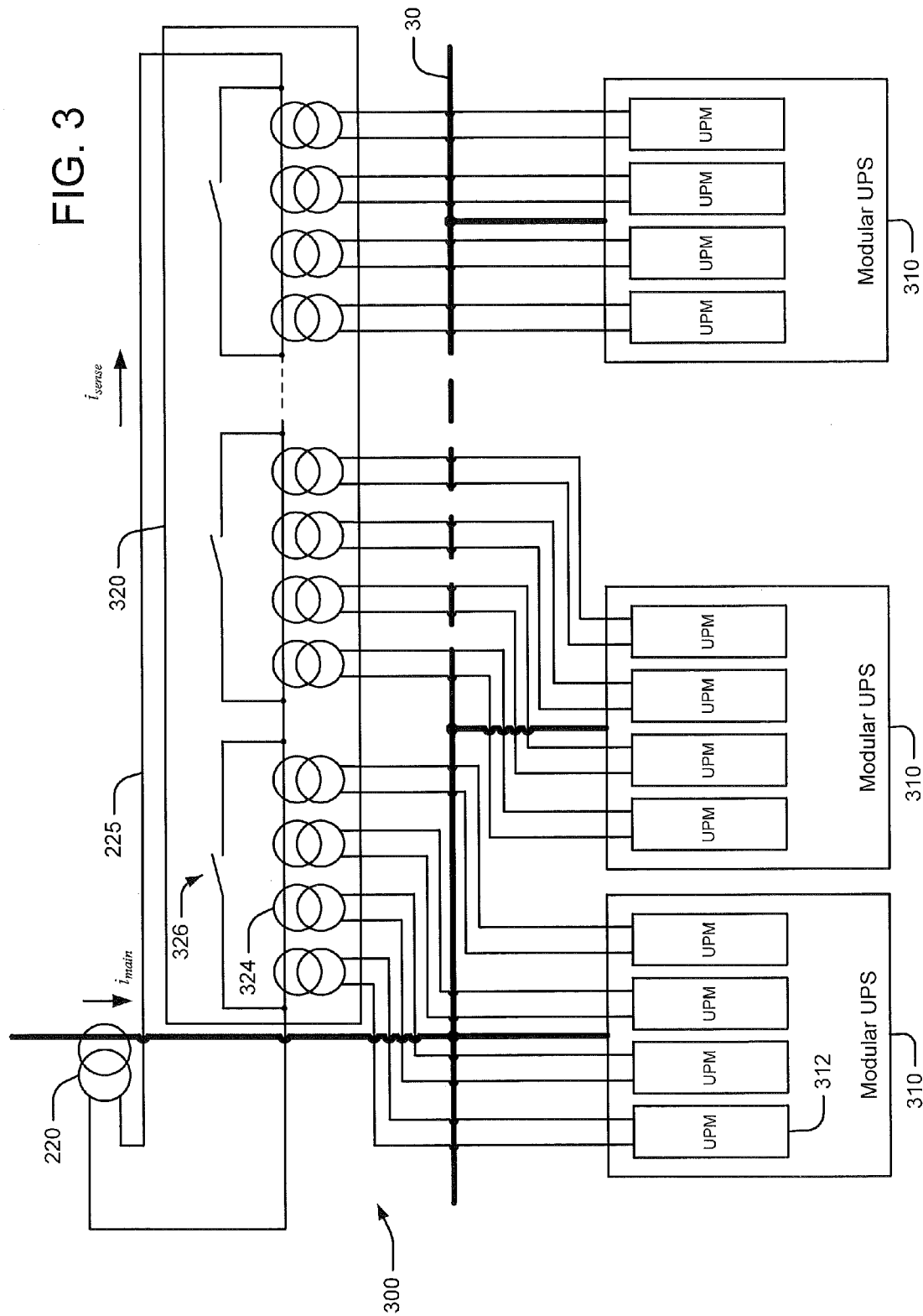
FIG. 3 is a schematic diagram illustrating a power distribution system including multiple modular UPS devices and distributed current sensing according to further embodiments of the inventive subject matter.

FIG. 3 illustrates a power distribution system 300 with an alternative arrangement. The power distribution system 300 includes a plurality of modular UPS assemblies 310 coupled to a power distribution network 30. Each UPS assembly 310 includes a plurality of UPMs 312. A first current transformer 220 senses an input current $i_{main}$ in an input line 30a of the power distribution network 30, generating a sense current $i_{sense}$ in a current sense line 225. A current sense circuit 320 includes second current transformers 324 located apart from the UPS assemblies 310 (e.g., at a centralized location). Respective bypass circuits 326 may be configured to bypass respective groups of the second current transformers 314 associated with respective ones of the UPS assemblies 310. The second current transformers 314 are configured to sense a sense current $i_{sense}$ and to provide current sense signals to respective UPMs 312 of the UPS assemblies 310. It will be appreciated that, in some embodiments, the arrangements in FIGS. 2 and 3 may be combined, e.g., some UPS devices may use co-located current transformers as shown in FIG. 2, while others use remote current transformers as shown in FIG. 3.

Figure 4:
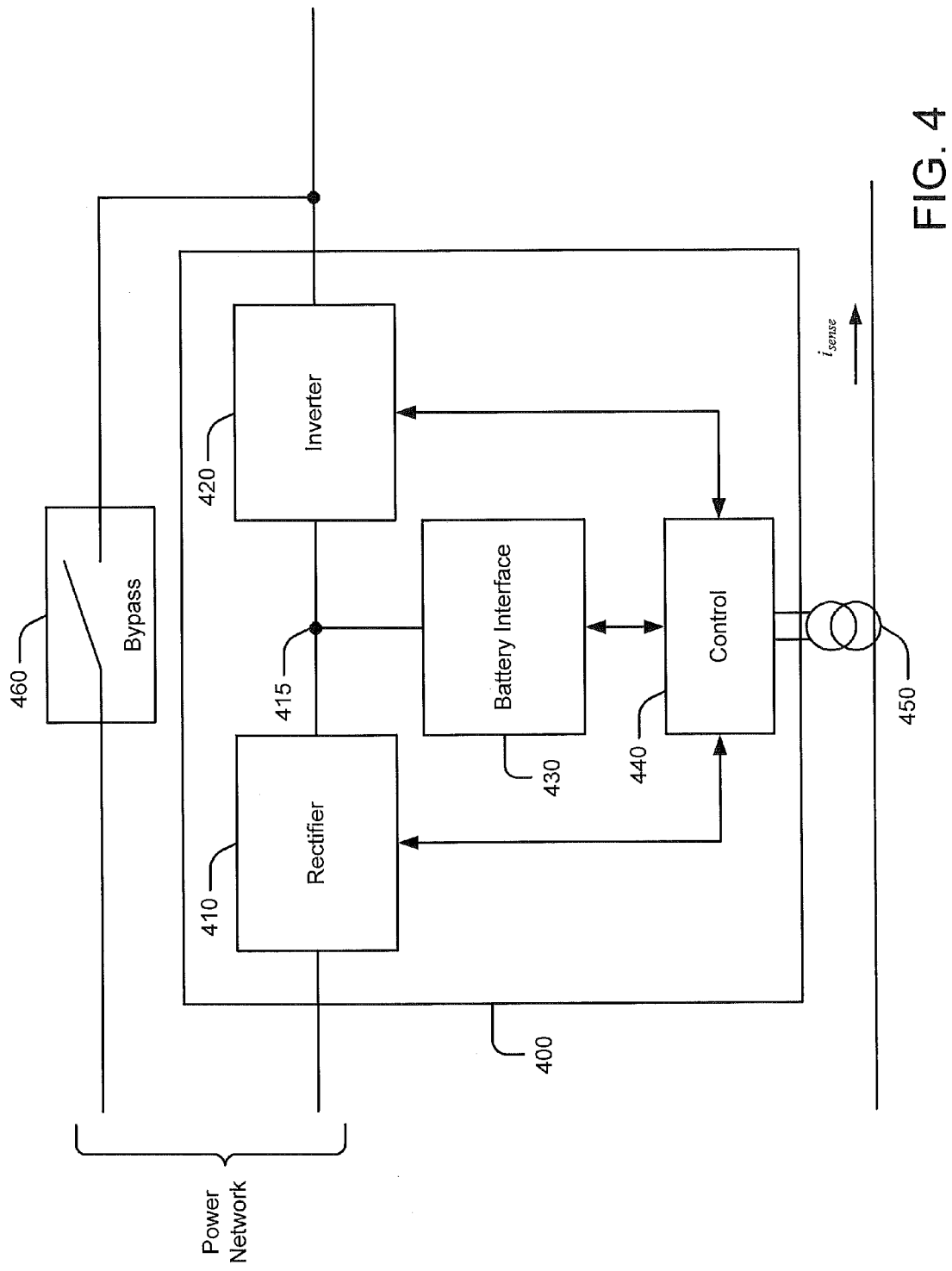
FIG. 4 is a schematic diagram illustrating distributed current sensing for control purposes in a UPS device according to some embodiments of the inventive subject matter.

FIG. 4 illustrates an example of a UPM 400. The UPM 400 includes a rectifier circuit 410 having an input configured to be coupled to an AC power distribution network and an output coupled to an inverter circuit 420 by a DC bus 415. An output of the inverter circuit 420 is configured to be coupled to a load. A battery interface circuit 430 is also coupled to the DC bus 415, and may be used to provide auxiliary power to the inverter circuit 410 from a battery in case of a failure of the AC power at the input of the rectifier circuit 410.

A control circuit 440 controls operations of the rectifier circuit 410, the inverter circuit 420 and the battery interface circuit 430. As shown, the control circuit 440 may control these UPM components responsive to a sense current $i_{sense}$, which, as explained above, may be representative of an input current of the power distribution network. This current sensing may be used, for example, to control the rectifier circuit 410 and/or the inverter circuit 420 to implement, for example, harmonic compensation. For example, when a bypass circuit 460 is used to bypass the inverter circuit 420 in a high-efficiency mode of operation, the control circuit 440 may operate the inverter circuit 420 responsive to the sense current $i_{sense}$ to t provide harmonic compensation while power is directly delivered to the load from the power distribution network.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system comprising:
a plurality of power conversion devices having inputs coupled in common to a power input line and each comprising a control circuit configured to operate the power conversion device responsive to a current sense signal at a current sense input thereof;
a first current transformer having a primary winding inductively coupled to the power input line;
a current sense line coupled in series with a secondary winding of the first current transformer; and
a plurality of second current transformers, each comprising a primary winding inductively coupled to the current sense line and comprising respective secondary windings coupled to respective ones of the current sense inputs.

2. The system of claim 1, wherein the plurality of power conversion devices comprises a plurality of uninterruptible power supply devices.

3. The system of claim 2, wherein the plurality of uninterruptible power supply devices comprises a plurality of uninterruptible power supply modules, respective groups of which are positioned at respective uninterruptible power supply assemblies and wherein the plurality of current sense transformers comprises respective sets associated with respective ones of the uninterruptible power supply assemblies.

4. The system of claim 3, further comprising a plurality of bypass circuits, respective ones of which are configured to bypass respective ones of the sets.

5. The system of claim 2, wherein the second current transformers are co-located with the uninterruptible power supply devices.

6. The system of claim 2, wherein the second current transformers are positioned remotely from the uninterruptible power supply devices.

7. The system of claim 2, wherein the uninterruptible power supply devices are configured to provide harmonic compensation responsive to a current in the power input line sensed by the first current transformer.

8. An uninterruptible power supply apparatus comprising:
a plurality of uninterruptible power supply modules, each having a current sense input; and
at least one current transformer having a primary winding configured to be inductively coupled to a secondary winding of an external current transformer and a secondary winding coupled to the current sense inputs of the uninterruptible power supply modules.

9. The apparatus of claim 8, wherein the at least one current transformer comprises a plurality of current transformers and wherein secondary windings of respective ones of the plurality of current transformers are coupled to current sense inputs of respective ones of the uninterruptible power supply modules.

10. The apparatus of claim 9, further comprising a bypass circuit configured to bypass the plurality of current transformers.

11. The apparatus of claim 8, further comprising a bypass circuit configured to bypass the at least one current transformer.

12. The apparatus of claim 8, wherein the uninterruptible power supply modules are configured to provide harmonic compensation responsive to a current sense signal produced by the at least one current transformer.

13. A system comprising:
a first current transformer comprising a primary winding inductively coupled to a power line of a power distribution system;
a current sense line coupled in series with a secondary winding of the first current transformer; and
a plurality of second current transformers, each second current transformer comprising a primary winding inductively coupled to the current sense line and respective ones of the second current transformers having a secondary winding configured to be coupled to respective current monitoring devices.

14. The system of claim 13, wherein the secondary windings of the second current transformers are configured to be coupled to respective power conversion devices.

15. The system of claim 14, wherein the second current transformers are configured to be co-located with the power conversion devices.

16. The apparatus of claim 14, wherein the second current transformers are configured to be positioned remotely from the power conversion devices.

* * * * *